United States Patent [19]

Gellatly

[11] 4,419,557
[45] Dec. 6, 1983

[54] METHOD AND APPARATUS FOR WELDING METAL PARTS COATED WITH A THERMOPLASTIC

[75] Inventor: John S. Gellatly, LaGrange, Ill.

[73] Assignee: Western Electric Company, Inc., New York, N.Y.

[21] Appl. No.: 337,056

[22] Filed: Jan. 4, 1982

[51] Int. Cl.³ .............................................. B23K 11/10
[52] U.S. Cl. ................................ 219/86.25; 219/116; 219/117.1
[58] Field of Search .................. 219/86.25, 108, 117.1, 219/106, 116, 119

[56] References Cited

U.S. PATENT DOCUMENTS

| | | | |
|---|---|---|---|
| 1,189,581 | 7/1916 | Kicklighter | 219/117.1 |
| 2,491,169 | 12/1949 | Early et al. | 219/116 |
| 3,643,057 | 2/1972 | Becker | 219/106 |

FOREIGN PATENT DOCUMENTS 454979  2/1975  U.S.S.R. .................. 219/86.25

*Primary Examiner*—C. C. Shaw
*Attorney, Agent, or Firm*—R. P. Miller; K. R. Bergum

[57] ABSTRACT

A pair of thermoplastic coated, paramagnetic metal sheets (26 and 27) are moved from a position within a first bus loop half (28) to a position within a second loop half (29) while a pair of electrodes (31 and 32) are cyclically moved to engage and weld a line of spots along the sheets. Constant current pulses are cyclically applied to the welding electrode (32) and through the loop halves (28 and 29) to the welding electrode (31). The current divides in the loop halves in proportion to the positionment of the metal sheets in the respective loop halves so that eddy current and hysteresis losses are held to constant minimum values. Auxiliary heaters (43 and 44) act to heat the electrodes to melt and displace the thermoplastic coating along the line of engaged spots prior to the cyclic application of the weld pulses.

13 Claims, 9 Drawing Figures

METHOD AND APPARATUS FOR WELDING METAL PARTS COATED WITH A THERMOPLASTIC

FIELD OF THE INVENTION

This invention relates to methods and apparatus for welding together two sheets of thermoplastic coated metal and, more particularly, to intermittently advancing a pair of welding electrodes across the sheets and cyclically moving the electrodes into engagement with the sheets to first melt the engaged spots of coating and then effectuate a weld with current pulses of constant magnitude.

BACKGROUND OF THE INVENTION

The manufacture of certain types of telephone cables require the shaping of a plastic coated steel strip about the cable core. This operation is advantageously carried out by continously running the sheathing device thus necessitating an availability of a continuous supply of sheathing material. For economical operation, it is manifest that the sheathing operation be not disrupted to effectuate the welding of a fresh supply of coated sheathing material to the trailing end of the about to be exhausted strip of sheathing material.

The dielectric plastic coating on the steel strip presents a problem in that it must be removed prior to the welding operations. Heretofore, one procedure that was followed included the steps of mechanically removing the plastic coatings from the trailing and leading ends of the new and old steel strips, and then placing the end sections of the respective strips in overlapping relation whereafter spot welds were made along the sections of the overlap. Subsequently, a substitute plastic coating must be pressure-temperature bonded to cover the large area of bare material. In this process, the trailing and leading ends of the strips are cut along diagonals so that the resultant welded joint is along a diagonal which facilitates the passage of the welded joint through the sheathing apparatus.

In U.S. Pat. No. 3,643,057 issued Feb. 15, 1972, to O. A. Becker, there is disclosed a method of welding two overlaying metal sheets coated with a thermoplastic material. The welding apparatus used to practice this method includes an auxiliary heating circuit which is connected to spaced sections of the metal sheets at locations where the plastic coating has been removed. The auxiliary circuit functions to resistance heat the intervening sections of metal to melt or destroy the plastic coating in the areas to be welded. Next, a pair of pressurized electrodes are moved into engagement with the melted coating to apply welding current to resistance weld the overlapping sections of the metal strips. In other instances, the patent suggests using a stream of hot air to melt the plastic coatings on the sheets prior to movement of the welding electrodes and the subsequent application of welding current to the joint.

In the use of alternating current spot welding machines, it is desirable to apply a series of welding pulses of the same magnitude during each welding cycle so as to obtain a neat, uniform line of weld spots having equal strength. Such welding apparatus often includes a first bus arm having an electrode mounted thereon and a second bus arm for supporting a second welding electrode. As the sheets to be welded are incrementally moved between said electrodes, and the electrodes are cyclically moved into engagement with the sheets, welding currents are applied through the respective bus arms to effectuate a series of spot welds. The current flowing through the bus arms sets up magnetic fields which are effective to induce eddy currents in the metal sheets, which together with hysteresis losses resulting from the magnetization and demagnetization of the sheet by the a.c. current cause an increase in impedance.

The cumulative effect of the eddy current and hysteresis losses and the consequent increase in impedance is to reduce the effective current delivered to the welding electrodes for the welding operations. In order to compensate for the increase in impedance during each subsequent welding cycle more and more current of greater magnitude must be supplied to the electrodes so that uniform welds of equal strength are produced.

SUMMARY OF THE INVENTION

This invention contemplates, among other things, methods and apparatus for welding overlaying sections of thermoplastic coated metal sheets with welding current pulses of constant magnitude.

More particularly, a pair of thermoplastic coated sheets of paramagnetic material, such as steel or chromium plated steel, are positioned within a first half loop of an open frame rectangular bus and then the frame is incrementally advanced relative to the sheets so that the sheets are eventually positioned within the second half loop of the rectangular frame. During the dwells between incremental advances of the frame, a pair of welding electrodes are brought into pressure engagement with the successive sections of the sheet.

The welding electrodes are heated by an auxiliary circuit and during an initial electrode engagement period are effective to melt the thermoplastic. Following the thermoplastic melt, a series of alternating welding pulses are applied through a transformer secondary having a first terminus connected to a midpoint of one long crossarm of the rectangular bus and a second terminus connected to a first of the welding electrodes which is located adjacent to the midpoint of the long crossarm. The other or second welding electrode is connected to the midpoint of the other long crossarm of the rectangular bus frame. The applied welding pulses proportionately divide to flow through both half loops in accordance with the impedance of the respective loops to the electrodes to effectuate the welding of the sheets.

When the sheets are positioned in a first half loop, the applied welding pulses are flowed through the other or second half loop, because, at this time, the second half loop presents a minimum impedance to current flow. More specifically, as the current attempts to flow in the first half loop, magnetic fields are established which induce eddy currents in the metal sheets. The applied a.c. pulses set up magnetic fields which magnetize and demagnetize the sheets thus resulting in hysteresis losses. The net effect of the eddy currents and the hysteresis losses is to increase the impedance in the first loop half to such an extent that the greater portion of the current will be directed through the second loop half to the welding electrodes.

As the frame is moved and more and more of the metal sheets are positioned within the second loop half, there will be an increase in impedance in the second half and a decrease in current flow. At the same time, there will be a decrease in the eddy current and hysteresis losses in the first loop half so that there will be an increase in current flow through the first loop half. However, it will be appreciated that the overall impedance of the two loop halves remain constant and, hence, constant current pulses will be applied to the welding electrodes. In other words, as the frame is advanced relative to the sheets, there will be proportionate changes in the impedance in the respective loop halves so that the same amount of energy is delivered to the welding electrodes during each welding operation.

DESCRIPTION OF THE DRAWINGS

Other features and advantages of the invention will be apparent upon consideration of the following detailed description when considered with the accompanying drawings, wherein.

DETAILED DESCRIPTION

Figure 1:
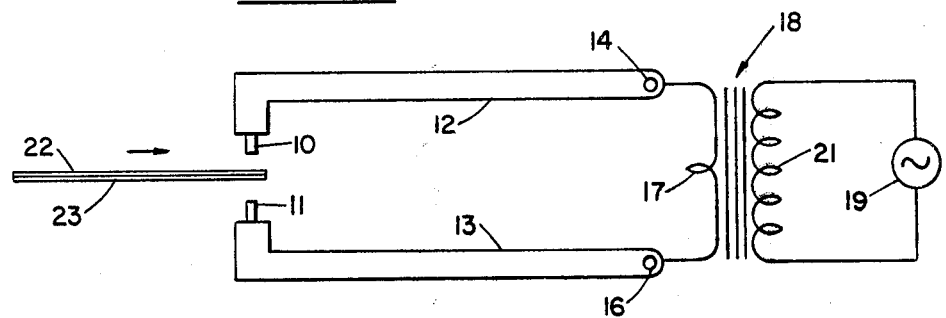
FIG. 1 is a schematic showing of a prior art a.c. welding apparatus.
Figure 2:
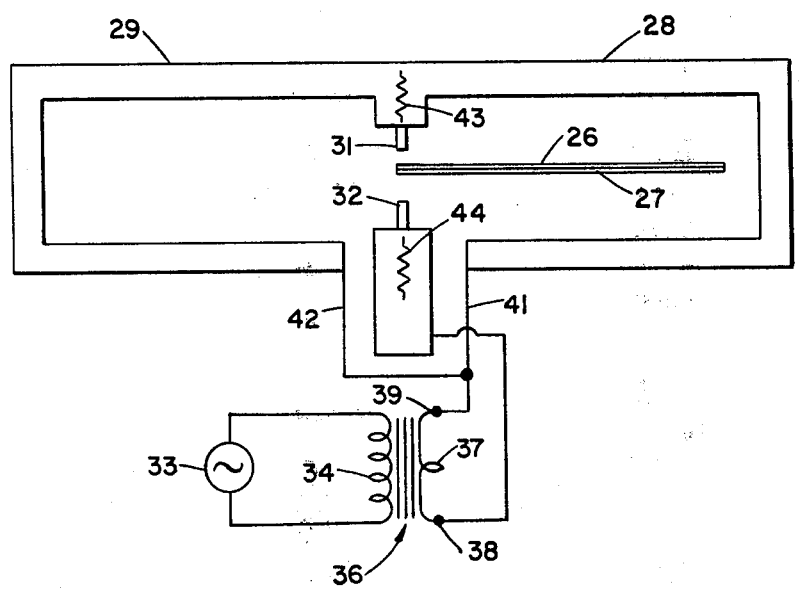
FIG. 2 is a schematic showing of a welding device utilizing the principles of operation that are incorporated in the apparatus shown in the other figures.

A more comprehensive understanding of the welding principles utilized in the present invention may be had by initially considering a typical prior art welding apparatus, such as schematically shown in FIG. 1, and then considering the welding apparatus schematically shown in FIG. 2 which incorporates the principles of operation utilized in the present invention and more completely depicted in a working embodiment of the invention shown in the other figures.

FIG. 1 shows a pair of welding electrodes 10 and 11 secured to a pair of movable conductive bus bars 12 and 13 pivotally mounted on pivots 14 and 16. The pivot ends of the bus bars are connected to end terminals of a secondary winding 17 of a step-down transformer 18. A.C. welding pulses from a source 19 are periodically applied to a primary 21 of the transformer. A pair of paramagnetic workpieces 22 and 23, such as sheets or strips of chromium plated steel or plain steel, are incrementally advanced past the welding electrodes 10 and 11 into the gap between the bus bars 12 and 13. Suitable means (not shown) are provided to cyclically pivot the bus bars 12 and 13 to move the welding electrodes 10 and 11 into engagement with opposite sides of the workpieces 22 and 23 during dwells in the incremental advancement of the workpieces.

The flow of a.c. welding current pulses through the bus bars 12 and 13, the welding electrodes 10 and 11 and the workpieces 22 and 23 acts to set up magnetic fields. As the workpieces are advanced between the bus bars 12 and 13, these magnetic fields create eddy currents in the workpieces. Also, as the magnetic fields build up and collapse, flux is induced in the workpieces to magnetize and demagnetize the workpieces causing hysteresis losses. The cumulative effect of the eddy currents and hysteresis losses is to increase the impedance in the energizing circuit for the welding electrodes 10 and 11. In order to obtain equal current pulses from weld-to-weld and thus uniform welds for all welding cycles, it is necessary to increase the current output from the source 19 in amounts sufficient to compensate for each increase in impedance.

The present invention overcomes these problems by utilizing a circuit such as schematically shown in FIG. 2. In this instance, paramagnetic workpieces, such as sheets 26 and 27, are initially positioned within a first rectangular bus loop half 28, and then a relative movement is imparted between the metal sheets and the bus loop half 28 to sequentially reposition the metal sheets within a second rectangular bus loop half 29. During dwells in the sequential repositioning, a pair of welding electrodes 31 and 32 are moved into engagement with opposite sides of the metal plates. Following each engagement of the welding electrodes, a.c. welding current pulses are applied from a source 33 through a primary winding 34 of a step-down transformer 36 to a secondary transformer winding 37. A circuit from the secondary winding 37 may be traced from a first terminal 38 to the welding electrode 32 and from a second terminal 39 of the secondary winding through branch circuits 41 and 42 through the first and second bus loop halves 28 and 29 to the welding electrode 31.

Initial current pulses attempting to flow through bus loop half 28 set up eddy current and hysteresis losses in the metal sheets 26 and 27, thus increasing the impedance of this circuit to such an extent that the greater portion of the current flows through branch circuit 42 and the second bus loop half 29 which, at this time, offers significantly less impedance to the current flow. As the workpieces and bus halves are moved relative to each other, and the sheets 26 and 27 are repositioned more and more within the second bus loop half, there will be a consequent increase in the current flow in the first bus loop half 28 and a corresponding decrease in current flow in the second bus loop half 29. In other words, as the sheets are successively repositioned from the first bus loop half to the second bus loop half, there will be a concomitant decrease in the impedance in the bus loop half 28 and an increase in the impedance encountered in the bus loop half 29. It may be thus appreciated that the overall circuit presents a constant impedance, hence, equal current pulses may be applied to obtain uniform welds.

The invention also contemplates welding workpieces constructed of paramagnetic material which are coated with a thermoplastic, such as ethylene-acrylic acid copolymer. To attain this result, the mounting structures for the welding electrodes 31 and 32 are provided with auxiliary heaters depicted by the resistances 43 and 44. When the welding electrodes 31 and 32 are brought into pressure engagement with spots on the opposite sides of the workpieces, the now heated electrodes are effective to heat and melt spots of the engaged thermoplastic coatings and, thus, make metal contact with the metal sheets. The spots of coating on the intervening sides of the metal sheets are also melted and are squeezed outwardly so that the welding current may readily flow through the entire length of the spot to be welded. The welding current flowing through the relatively low impedance loop halves 28 and 29 may be of a high magnitude, e.g., 1000 amps, and is effective to uniformly resistance weld spots along a line on the engaged sheets 26 and 27.

Figure 3:
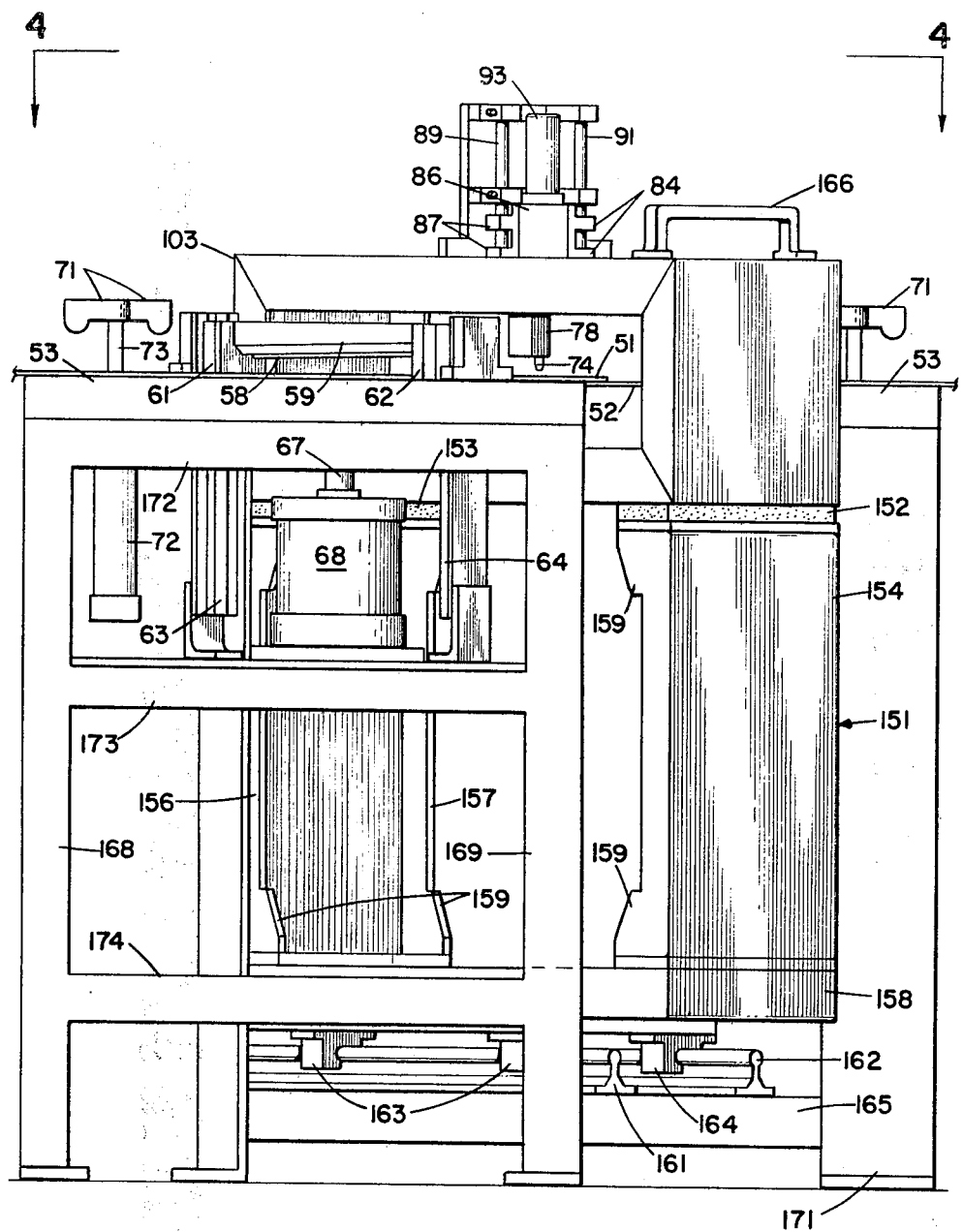
FIG. 3 is a front elevational view of a welding apparatus constructed and operated in accordance with the principles of the present invention.
Figure 4:
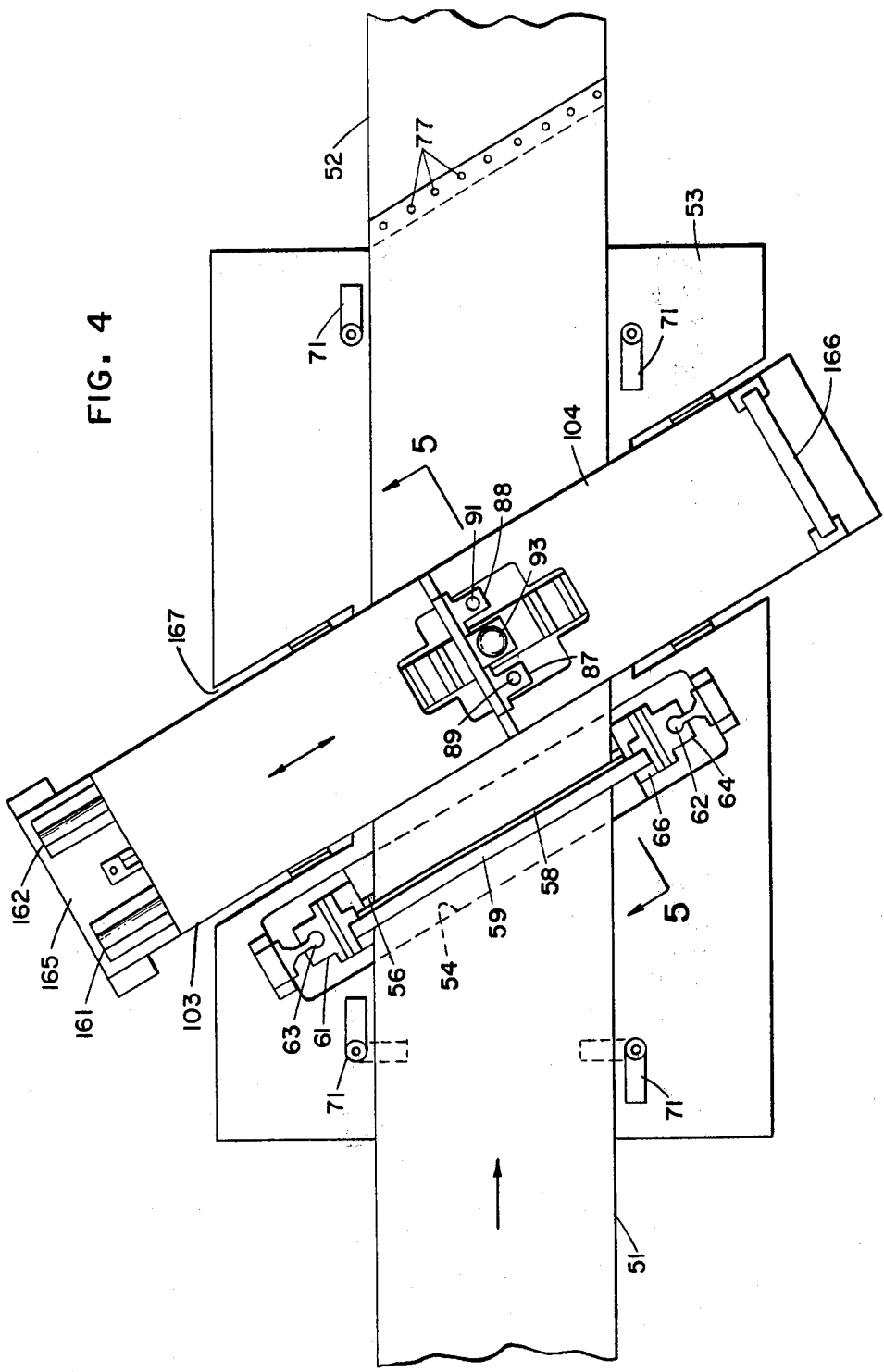
FIG. 4 is a top plan view looking in the direction of the arrows 4—4 in FIG. 3 showing a welding apparatus which includes a carriage for diagonally moving welding electrodes across a pair of sheets of material to be welded.
Figure 5:
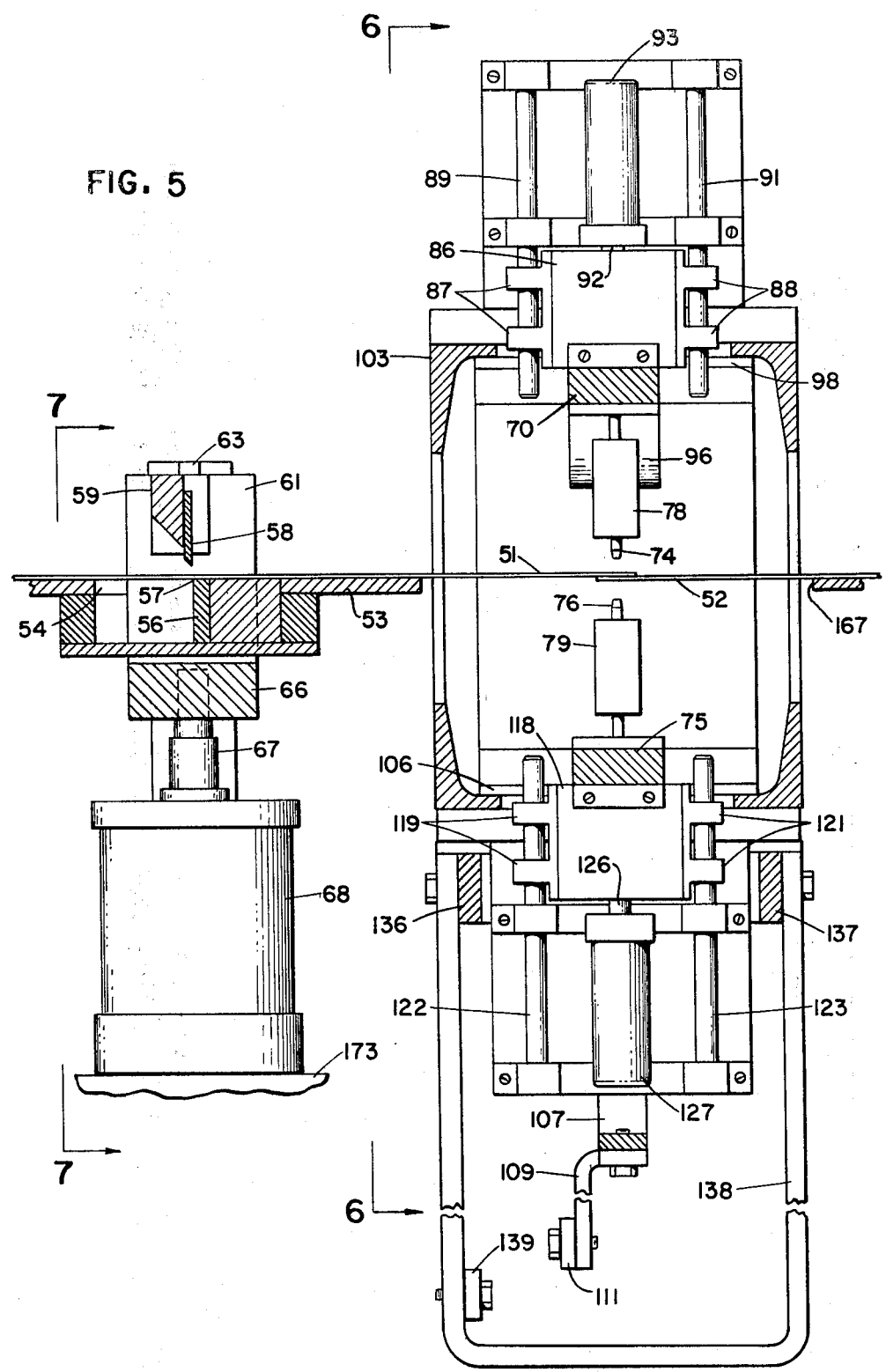
FIG. 5 is a cross-sectional view taken along line 5—5 of FIG. 4 showing structures for operating the welding electrodes along with a cutter for diagonally severing the sheets of material to be welded.
Figure 7:
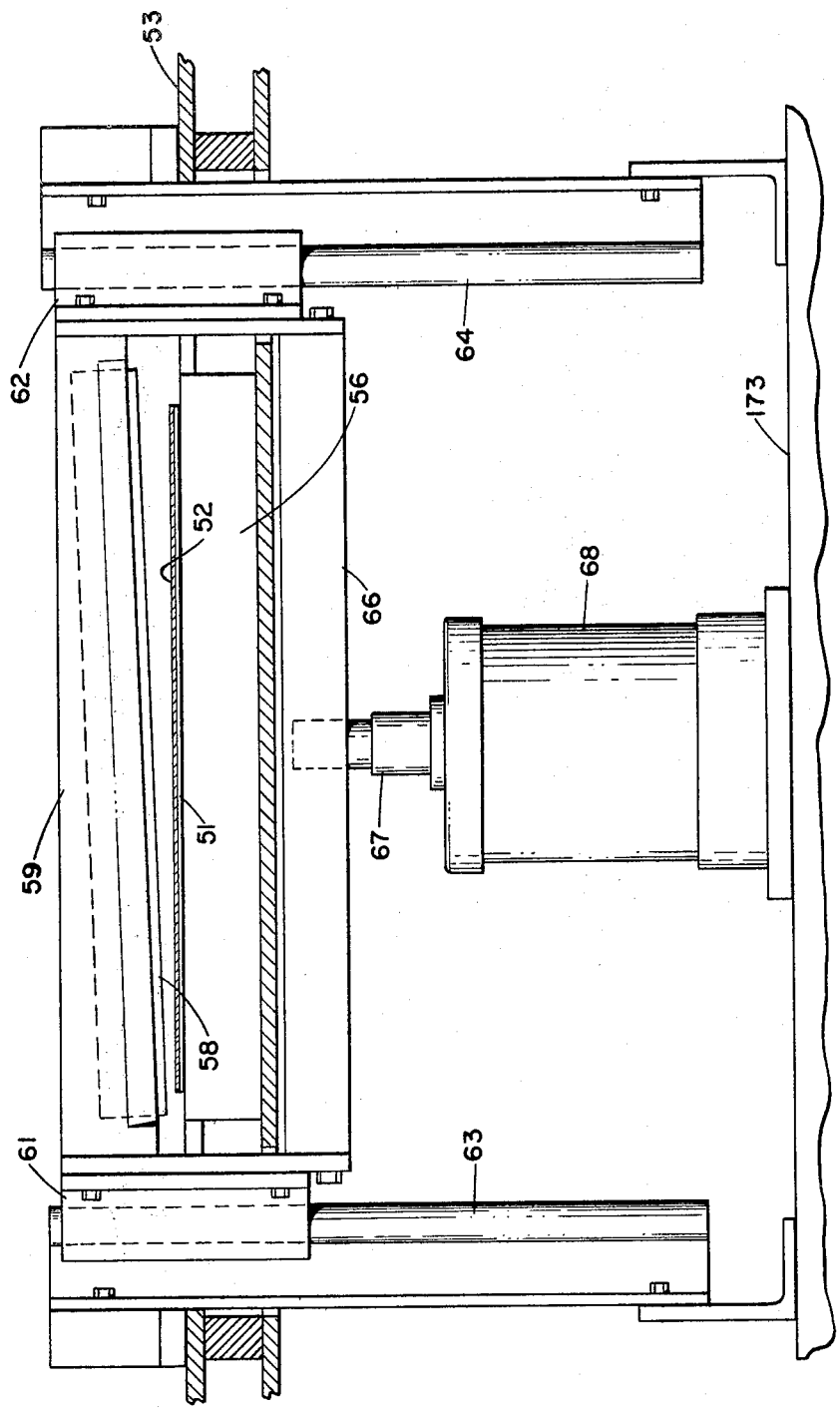
FIG. 7 is a view taken along line 7—7 of FIG. 5 showing further details of construction of the cutter.

Considering now a working or practical embodiment of the invention, attention is directed to FIGS. 3, 4 and 5 wherein there is shown a pair of flexible strips 51 and 52 of a paramagnetic metal, such as a chromium plated steel which may also be coated on both sides with a thermoplastic material, such as ethylene-acrylic acid copolymer. The metal strip 52 rests on a table top 53 having a first opening 54 therein in which is mounted a die block 56 having a shear edge 57 positioned beneath a cutter blade 58. The cutter blade 58 is mounted in a backing plate 59 which is secured at opposite ends to slide blocks 61 and 62 that are adapted to ride on guide rails 63 and 64. As best shown in FIGS. 5 and 7, a crossbar 66 interconnects the bearing blocks 61 and 62 and is attached to a piston rod 67 emanating from an air cylinder 68.

The cutter blade 58 and the opening 54 extend in a diagonal fashion across the table 53 and thus are positioned at a diagonal with respect to the lay of the metal strips 51 and 52. When the air cylinder 68 is operated, the piston 67 pulls down the crossbar 66, the guide blocks 61 and 62, the blade support holder 59 and the blade 58. The moving blade severs the strips 51 and 52 against the shear edge 57 along diagonal lines.

The severing device is utilized to trim the ends of the strips 51 and 52 prior to a welding operation. More particularly, the trailing end section of the about to be exhausted strip 52 is positioned on the table 53 underneath the blade 58. The leading end of the new strip is placed in overlaying relationship with respect to the trailing end of the strip 52. The operation of the shear blade 58 trims both strips along diagonal lines. Prior to this trimming operation, a number of clamps 71 are moved to engage edge sections of the strips 51 and 52. The clamps 71 may be operated by air cylinders, such as denoted by the reference numeral 72. Operation of air cylinders 72 will effectuate a rotation of screw mounted piston rods 73 so that the clamps 71 are pivoted into position to overlay and grip the edges of the strips 51 and 52.

Following the severing operation, the diagonal cut end sections of the strips 51 and 52 are placed in overlaying relation and positioned between a pair of welding electrodes 74 and 76. The welding electrodes are cyclically controlled and moved so as to weld a series of spots 77 (see FIG. 4) along a diagonal line extending across the overlaying diagonally cut end sections of the metal strips.

Figure 6:
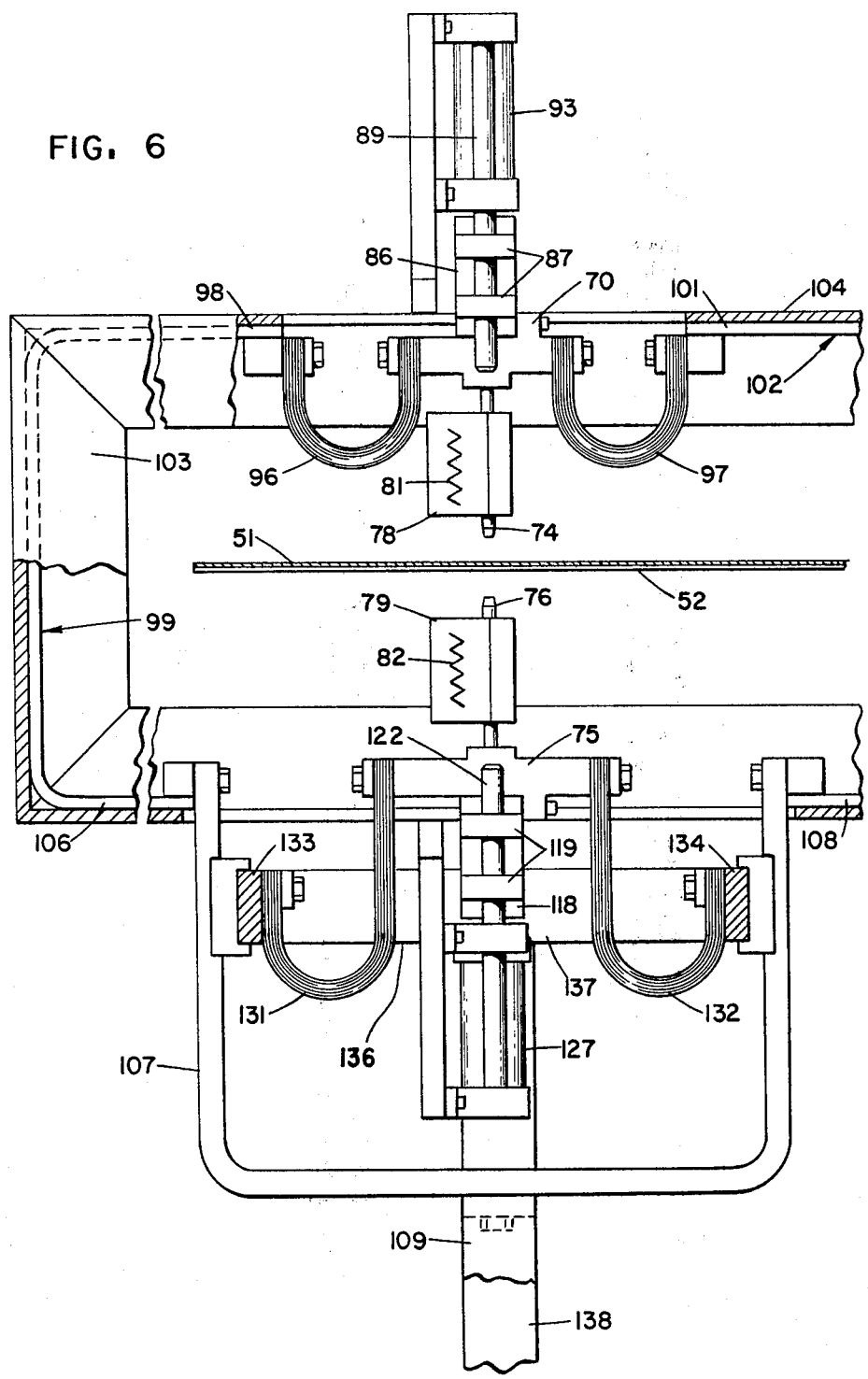
FIG. 6 is a cross-sectional view taken along line 6—6 of FIG. 5 particularly illustrating the construction of a rectangular bus frame for applying energizing current to the welding electrodes.

Looking at FIGS. 5 and 6, the welding electrodes 74 and 76 are shown as being fixed in crossplates 70 constructed of highly conductive material. Clamped to the electrodes are two blocks 78 and 79 with a pair of resistance heaters depicted by the resistances 81 and 82 which function to heat the blocks and hence the welding electrodes to such an extent that when the welding electrodes are brought into engagement with the thermoplastic coated strips, spots of thermoplastic are melted and displaced on the upper and under exposed sides of the strips. The movement of the electrodes 74 and 76 into pressure engagement with the strips 51 and 52 is also effective to melt and displace spots of thermoplastic on the intervening sides of the strips. During a welding cycle, the electrodes are held in engagement with the strips for a predetermined time to allow for the melting and displacement of the plastic prior to the application of welding current.

As shown best in FIG. 5, the crossplate 70 is attached to a mounting block slide 86 having oppositely extending pairs of ears 87 and 88. The ears 87 and 88 are bored to receive and mount circular sleeve-like bearings that ride on guide rods 89 and 91. The slide 86 is coupled to a piston rod 92 emanating from an air cylinder 93. Operation of the air cylinder 93 functions to move the piston rod 92 and the slide 86, whereupon the upper electrode 74 moves into engagement with a spot on the upper surface of the strip 51.

As illustrated in FIG. 6, the upper welding electrode 74 is electrically connected through the crossplate 70 to a pair of laminated flexible copper straps 96 and 97. Strap 96 is attached to an upper crossbar section 98 of a first conductive bus loop half generally denoted by the reference numeral 99, while strap 97 is attached to an upper crossbar section 101 of a second conductive bus loop half generally denoted by the reference numeral 102. Each loop half is rectangular in shape and constructed of a good conducting metal, such as copper or a copper alloy. The bus loop halves 99 and 102 are encased in aluminum frames 103 and 104. A lower crossbar section 106 of the left bus loop half is attached to a first end of a U-shaped bus member 107. The U-shaped bus member 107 is connected at its other end to a lower cross bus bar section 108 of the right-hand bus loop half 102.

The U-shaped bus member 107 is connected through a bracket arm 109 and a terminal 111 to an upper terminal 112 (see FIGS. 5 and 8) of a secondary winding 113. Winding 113 may be of a single turn and forms part of a step-down transformer 114 having a multi-turn input winding 116. As illustrated in FIGS. 5 and 6, lower electrode 76 is secured to the conductive crossplate 75 that is attached to a block slide 118 having laterally projecting opposed pairs of ears 119 and 121. The ears 119 and 121 are bored to receive sleeve bearings which accommodate guide rods 122 and 123. The block 118 is coupled to a piston rod 126 emanating from an air cylinder 127. Operation of air cylinder 127 is effective to move the piston rod 126 and the intervening structure to advance the lower electrode 76 into engagement with a spot on the undersurface of the strip 52.

As shown in FIG. 6, the lower electrode 76 is electrically connected through the crossplate 75 to first ends of a pair of laminated flexible copper straps 131 and 132. The other ends of the straps 131 and 132 are bolted to oppositely disposed bus bars 133 and 134 which are interconnected by conductive crossmembers 136 and 137. Attached to crossmember 137 is a U-shaped bus 138 (see FIG. 5) having a terminal 139 electrically connected to a lower terminal 141 of the transformer winding 113 (see FIG. 8).

When the a.c. welding current is impressed through the transformer 114, the current passes through terminal 111 and then through the left and right bus loop halves 99 and 102 to the straps 96 and 97, whereafter the current is directed through crossmember 70 to the upper welding electrode 74. The current impressed at terminal 141 passes through terminal 139 and then through the U-shaped bus 138 to the bus members 133 and 134. This current is applied through straps 131 and 132 and the crossmember 75 to the lower welding electrode 76.

Attention is directed to FIG. 3 which shows the welding electrodes and the encased rectangular bus for energizing the electrodes as being mounted on a carriage 151 that is adapted to move diagonally across the ends of the strips 51 and 52 (see also FIG. 4). More definitively, the frame 103-104 containing the copper bus loop halves 99 and 101 and the supported welding electrodes 74 and 76 is mounted on bolster plates 152 and 153 constructed of a dielectric material, such as phenolic fabric. The bolster plate 152 rests on the top of an upright support member 154 while the bolster plate 153 rests on the top of struts 156 and 157. The carriage members 154,156 and 157 are welded to a rectangular base frame 158. Suitable braces, such as depicted by the reference numeral 159, are mounted in the corners of the members constituting the carriage.

The carriage 151 is slidably mounted on a pair of spaced guide rails 161 and 162 which slidably fit within arcuate bearing surfaces formed in two pairs of guide blocks 163 and 164 extending from the bottom of the base frame 158. In turn, the guide rails 161 and 162 are supported on a base plate 165. A U-shaped handle 166 is mounted on and secured to the top of the bus frame 104, and is utilized by an attending operator to incrementally move the carriage to traverse the electrodes 74 and 76 across a path that runs in line with the diagonal cuts that are formed on the trailing and leading ends of the respective strips 51 and 52. The support structure for the overall apparatus is in the form of a table fabricated with the top 53 having a first diagonal slot 54 to accommodate the severing device, and a second diagonal opening 167 to receive and permit the passage of the carriage 151. The table includes three aligned front legs 168, 169 and 171 that are connected by crossbraces to rear legs (not shown). The legs 168 and 169 are welded to crossbraces 172, 173 and 174. Suitable braces, not shown, are also provided for the rear legs. Further support for the table structure is provided by the plate 165 which is attached to the bottom section of the table legs.

In summary, when a reel of strip material, such as plastic coated steel, supplying an associated utilization device, such as a cable sheathing apparatus, nears exhaustion, the attending operator slows down the sheathing apparatus and accumulates the bulk of the remaining strip in an accumulator located between the welding apparatus and the sheathing apparatus. The trailing end of the strip is placed on and secured to the top of the table 53 by actuating clamps 71. The attending operator depresses simultaneously spaced pushbuttons 175 and 176 to operate a solenoid control 178 which functions to operate air cylinder 68, whereupon the piston 67 is drawn downwardly. In the alternative, a pneumatic control circuit may be employed to selectively operate the air cylinder 68. Downward movement of piston 67 is accompanied by downward movement of the cutter blade 58 to shear the strip along a diagonal. The clamps are released and the severed end section of the strip is moved between the electrodes 74 and 76 and reclamped.

A new supply reel of strip 52 is manipulated into position so that the leading end of the new strip may be positioned beneath the cutter blade 58. The operating mechanism for the cutter blade 58 is reoperated to sever the leading end of the new strip along a diagonal line. The attending operator thereafter moves the leading cut edge of the new strip into overlapping relation with the trailing end of the other strip so that the overlapping sections of the strip are positioned between electrodes 74 and 76. The new strip is thereupon clamped to the table.

The overlying severed end sections are now positioned to be engaged by successive movement of the welding electrodes 74 and 76. Next, the attending operator grasps the handle 166 and initiates an incremental movement of the carriage 151 along a diagonal path. Following each incremental movement of the carriage, the welding electrodes 74 and 76 are operated to effectuate the weld of a line of diagonal spots 77 along the overlaying sections of the strips 51 and 52.

More specifically, following each incremental advance of the carriage, the attending operator depresses a pushbutton 181 to energize a weld controller 177 which, in turn energizes a pair of solenoids 182 and 183 associated with commercial air reversing valves that respectively function to control the application of air to the cylinders 93 and 127. Controller 177 may be of commercial manufacture, such as Model 1300A-752 Control available from the Technitron Corporation of Carol Stream, Ill. The air admitted to cylinder 93 drives the piston 92 and the electrode 74 downwardly, while the air admitted to the cylinder 127 drives the piston 126 and the electrode 76 in an upward direction. The aligned electrodes are moved into pressure engagement with opposed spots on the strips.

Figure 8:
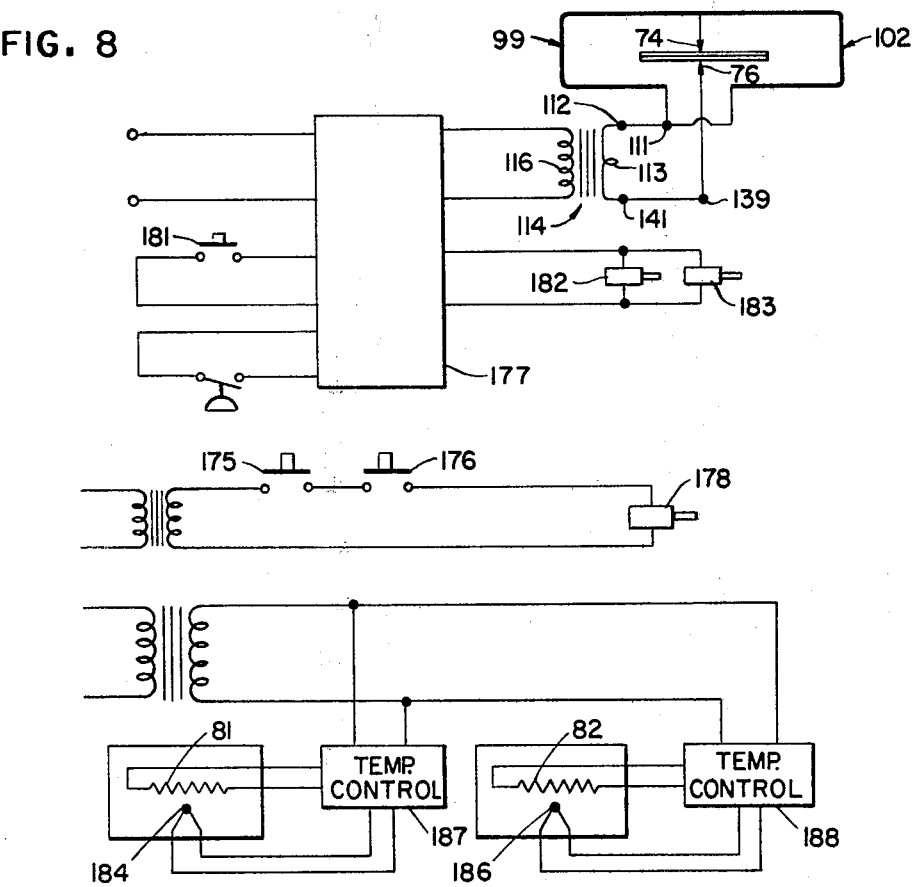
FIG. 8 is a schematic diagram of a circuit for energizing and heating the electrodes together with controls for operating the mechanical components of the welding apparatus.

As shown in FIGS. 6 and 8, the electrode housings 78 and 79 include heater elements or blocks 81 and 82 which are temperature controlled by sensing thermocouples 184 and 186 (see FIG. 8). Upon sensing a variation from a desired temperature in either or both of the electrodes, the associated thermocouples apply signals to a pair of temperature controller units 187 and 188 which react by accordingly increasing or decreasing the current flow to the heating elements. The controllers are set so that the heating elements heat the electrodes to a degree sufficient to melt the thermoplastic coating which is pressure engaged by the electrodes 74 and 76. The pressure engaged heated electrodes are effective to displace the melted plastic coating so that the surfaces of electrodes engage the metal of the strips 51 and 52. Also at this time the heated electrodes are effective to melt the aligned spots of thermoplastic on the intervening surfaces of the overlapped strips. These melted spots of thermoplastic are displaced so as to establish metal-to-metal contact between the strips 51 and 52.

After a preset delay, the controller 177 is automatically rendered effective to apply a series of a.c. current pulses to the electrodes 74 and 76 to effectuate a resistance weld. The applied welding current from the transformer terminal 112 flows through terminal 111 and then through branch circuits 99 and 102 to the upper electrode 74. During the first welding cycle, the welding electrodes 74 and 76 are positioned over border sections of the strips 51 and 52. For purposes of illustration, assume that as shown in FIG. 4 the electrodes are positioned over the lower edge of the strips. In this instance, the bulk of the strips are positioned within bus loop half 99-103. The current attempting to flow through this bus half 99-103 encounters a relatively high impedance due to the eddy current and hysteresis losses in the underlying strips. However, the eddy current and hysteresis losses and, thus, the impedance of the loop bus half 102-104 is at a minimum, thus favoring current flow.

As the welding cycles are successively executed and the carriage is moved diagonally in incremental steps across the strips for successive welding operation, there will be a progressive positioning of more and more of the strips within the loop bus half 102-104, and as a result there will be an increase in impedance presented by the loop half to current flow. Simultaneous therewith, the bus half 99-103 is incrementally moved over the strips, and as a result there will be a concomitant decrease in the impedance offered by this bus half to the flow of the welding current. This decrease in impedance presented to bus half 93-103 is due to the reduction in the eddy current and hysteresis losses. It may be thus appreciated that the net effect of the construction is to proportionately divide the a.c. welding current to flow in the respective loop bus halves in accordance with the impedance presented by each loop bus half. The total impedance encountered by the a.c. welding current remains substantially constant in all positions of the carriage and, hence, current pulses of constant magnitude may be applied to attain uniform welds.

Figure 9:
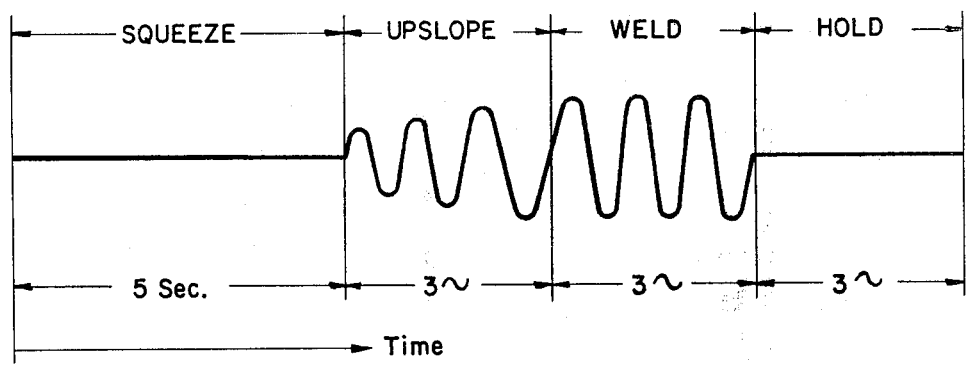
FIG. 9 is a graphic showing of a typical machine weld cycle.

A typical welding cycle regulated by the controller 177 is graphically illustrated in FIG. 9 which depicts the events occurring following the depression of the pushbutton 181 and the engagement of the welding electrodes with spots on opposite sides of the strips. The section of the graph marked "Squeeze", which may be of a five-second duration, represents the initial time that the welding electrodes engage the strip and the plastic coating is melted and displaced. Next, a.c. welding pulses are applied to the input 116 of the transformer 114. During this time marked "Up Slope", the welding current builds up for a time period equal to three cycles of the applied a.c. welding current. The buildup of the pulses is limited to a preset magnitude denoted by the graph section labeled "Weld".

During this "Weld" period, three cyclic pulses of constant magnitude are applied to the welding electrodes to cause the resistance welding of the engaged spots of the strips. The controller is effective to automatically terminate the application of the welding current but the welding electrodes 74 and 76 are held in engagement with the strips for an additional time period, e.g., a time typically equal to the duration of three current pulses. During this time marked "Hold", the welding spot is allowed to solidify and cool under the pressure applied by the engaged electrodes. The welding operations continued in an incremental fashion to weld a line of spots, such as the spots designated 77 in FIG. 4. Following the completion of the welding operation, the strips may be unclamped and advanced into the associated cable sheathing apparatus.

What is claimed is:

1. A method of welding together two paramagnetic metal parts, which includes:
    positioning the metal parts in a first of a pair of parallel connected conductive loop halves;
    imparting relative movement between the metal parts and said first conductive loop half to incrementally reposition the metal parts in the second conductive loop half;
    cyclically moving first and second welding electrodes toward each other to cyclically engage the metal parts as the metal parts are incrementally repositioned in the second conductive loop; and
    applying current pulses to the first welding electrode and through the first and second conductive loops to the second welding electrode during each engagement of the welding electrodes with the metal parts, whereupon the amount of current flow in the first and second conductive loops is proportional to the relative positions of the metal parts within the first and second conductive loops.

2. A method as defined in claim 1, wherein the metal parts are coated with a thermoplastic material, which further comprises:
    heating the electrodes to such an extent so as to melt and displace the thermoplastic coating in the areas engaged by and between the welding electrodes.

3. A method of welding two sheets of paramagnetic metal, which comprises:
    positioning the sheets within a first half of a bus frame, wherein the first and a second half of the bus frame are connected in parallel;
    moving the bus frame across the sheets so that the sheets are eventually positioned within the second half of the bus frame;
    applying a.c. welding current to (1) a first welding electrode movably mounted at a first junction of the bus frame halves, and (2) through the bus frame to a second welding electrode movably mounted at the opposed second junction of the bus frame halves; and
    cyclically moving the electrodes to engage and weld successive sections of the metal sheets, whereupon a portion of the current is progressively diverted from the second half of the bus frame to the first half of the bus frame as the sheets are progressively positioned within the second half of the bus frame.

4. A method of welding two sheets of paramagnetic metal, which comprises:
    positioning the metal sheets within a first half of a rectangular bus frame made up of two parallel connected half sections;
    incrementally moving the bus frame relative to the positioned metal sheets to incrementally position the metal sheets in the second half of the frame;
    moving a pair of welding electrodes into engagement with opposite sides of the metal sheets following each incremental movement of the bus frame;
    applying welding current through a secondary of a transformer at a first terminal thereof to a first of said electrodes, and at a second terminal thereof to the rectangular bus frame which in turn is connected to a second of said electrodes at a junction between said first and second halves of said bus frame, whereupon the current initially flows in said second half of said frame to said welding electrodes and increasing amounts of current flow in said first half of said frame as said frame is moved to position said metal sheets in said second half of said frame.

5. A method of welding a pair of metal paramagnetic strips coated with a thermoplastic material, which comprises:
    positioning the pair of strips within a first of a pair of conducting loops connected in parallel to a pair of welding electrodes;
    traversing the pair of welding electrodes and conductive loops across the strips while cyclically moving the electrodes into and out of pressure engagement with opposite sides of the strips;

heating the electrodes during pressure engagement with the strips to melt spots of thermoplastic positioned between the electrodes; and applying incremental pulses of a.c. energy to one of the welding electrodes and through the first and second conducting loops to the second welding electrode following each engagement of the electrodes with the strips so that initially more of the current flows through the second of said loops than through the first of said loops and thereafter more of said current progressively flows through the first of the loops as the electrodes traverse the metal strips.

6. A method of welding together the ends of two strips of paramagnetic metal coated with a dielectric thermoplastic, which comprises:

severing the trailing end of a first strip along a diagonal line;

severing the leading end of a second strip along a diagonal line;

placing the severed end sections of the respective strips in overlaying relation within a first half of a rectangular frame of electrically conductive material, wherein the first and a second half of the frame are connected in parallel;

moving the frame along a line diagonal to the lengths of the strip and over the overlaying diagonal sections of the strip;

applying a.c. welding energy to a pair of welding electrodes connected between opposed long arms of said rectangular frame at points at least approximately corresponding with the dividing of said frame into two half sections, said electrodes being initially positioned to one lateral side of said overlaying sections of said strips in said first half section, whereupon the initial welding energy is substantially applied through the second half section and is supplied in increasing amounts through the first half section as said frame moves across said overlaying end sections of said metal strips;

heating the electrodes to such an extent as to melt the dielectric thermoplastic coating upon said electrodes being brought into engagement with the overlaying sections of metal strips; and cyclically moving said electrodes to engage spots on opposite sides of the strips as the frame is moved to cyclically melt spots of the thermoplastic coating between said electrode and then weld together the engaged spots of metal strips.

7. An apparatus for welding two paramagnetic metal parts, which comprises:

a first conductive half loop;

a second conductive half loop;

a first welding electrode means electrically connected to first ends of said first and second conductive half loops;

a second welding electrode means aligned with the first welding electrode and inductively connected to second ends of said first and second conductive half loops;

means for supporting the metal parts in a position within said first conductive half loop;

means for imparting relative movement between said first and second conductive loops and said supporting means to reposition the metal parts between and then past said first and second electrode means into said second conductive half loop;

means for cyclically reciprocating the first and second electrode means to engage the metal parts; and means for inductively applying a.c. welding current pulses to the second electrode means and through the first and second conductive half loops to the first electrode means following each engagement of the first and second welding means, whereupon the initial welding pulses flow substantially in said second conductive loop and then progressively in greater amounts in the first inductive loop as the metal parts are repositioned in the second conductive loop.

8. A welding system as defined in claim 7, wherein the metal parts are coated with a thermoplastic material, which further comprises:

means for heating the electrodes to melt and displace the thermoplastic material in the areas engaged by and between the welding electrodes.

9. A system as defined in claim 7, wherein the relative movement imparting means includes:

a table having a top with two spaced sections for supporting the metal parts between the pairs of welding electrodes; and a carriage for mounting the conductive loops to receive the metal parts therein and move between the spaced sections of the table top.

10. A system for welding a pair of paramagnetic metal parts, which comprises:

a pair of welding electrodes;

a first branch circuit including said welding electrodes, a first conductive loop and an inductive winding;

a second branch circuit including said welding electrodes, a second conductive loop connected in parallel to said first conductive loop, and said inductive winding;

means inductively coupled to said inductive winding for applying a.c. energizing power to said inductive winding to apply welding current to one of said welding electrodes directly and to the other of said electrodes through said conductive loops; and means for imparting relative movement between the metal parts positioned within said first conductive loop and said welding electrodes so that the metal parts are eventually positioned within said second conductive loop, said metal parts being initially subjected to more welding current from said second conductive loop as said relative movement commences, said welding current being progressively diverted to said first conductive loop in accordance with the relative movement between said branch circuits and the metal parts.

11. A welding apparatus, which comprises:

a rectangular bus having an opening therein to define two loop halves connected in parallel for receiving a pair of paramagnetic sheets that are to be welded by a series of weld spots traversing the sheets;

means for supporting the sheets within a first loop half of the rectangular frame and between the long arms of said rectangular bus;

a first movable electrode electrically connected to the approximate midpoint of one of the long arms of the rectangular bus;

a second movable electrode positioned to move toward the first electrode;

means for incrementally moving the rectangular bus relative to the sheets so that more and more of the sheets are progressively positioned within the second loop half of the rectangular frame;

means for cyclically moving the electrodes to engage the sheets between incremental advances of the rectangular bus; and means rendered effective following each engagement of the electrodes with the sheets for applying alternating welding current through the bus to the first welding electrode and independently of said bus to the second welding electrode, whereupon said welding current initially flows through the second half of the rectangular loop, and then increasingly through the first half of the rectangular bus as the bus is incrementally moved and more and more of the sheets are positioned within the second half of the rectangular loop.

12. An apparatus for welding two sheets of weldable, paramagnetic material together, which comprises:

an open bus frame of electrical conductive material, said frame having a pair of opposed, parallel legs;

a first welding electrode positioned within the frame and electrically connected to the approximate midsection of a first pair of said legs;

a second welding electrode positioned within the frame and aligned with the first electrode;

means for supporting the two sheets of weldable material within the frame in overlaying positions to one side of said first and second welding electrodes;

means for incrementally moving the frame from a first position with the first and second electrodes on a first lateral side of said overlaying sheets to a second position with the first and second electrodes on the opposite sides of the overlaying sheets;

means for cyclically moving the electrodes into engagement with the sheets of weldable material between incremental advances of the frame; and means for cyclically applying a.c. welding current through said frame to said first welding electrode and independently of said frame to said second welding electrode following engagement of the electrodes with the sheets, whereupon said current initially flows through the said second side of the frame and progressively flows in greater amounts through said first side of the frame as the frame is moved from said first position to said second position.

13. An apparatus for welding a pair of strips of abutted paramagnetic metal coated with a thermoplastic material, which comprises:

a rectangular frame constructed of electrically conducting material, said frame comprising a pair of parallel first and second sections interconnecting a pair of parallel third and fourth sections;

a first welding electrode means electrically connected to the third section;

a second welding electrode means electrically connected through a secondary transformer winding to the fourth section;

means adapted to move said electrode means and said frame in increments across a pair of strips of coated metal initially positioned to one lateral side of said first and second electrode means and adjacent to said second section;

a pair of heater means respectively mounted on said first and second electrode means for melting the thermoplastic coating on the strips of metal positioned between and engaged by said first and second welding electrode means;

means for moving said first and second electrode means toward each other to engage the strips following each cyclic movement of said frame and said electrode means to melt and displace spots of thermoplastic material interposed between the electrodes; and means including a primary transformer winding for cyclically applying welding current to said secondary transformer winding following a time delay after each cyclic engagement of said electrode means with said abutted metal strips, said welding current thus being applied through said rectangular frame to said first welding electrode, and independently of said frame to said second welding electrode, whereupon the welding current initially flows through said first frame section and then is diverted in increasing amounts through said second frame section as the rectangular frame is moved across abutted strips of metal.

* * * * *